United States Patent [19]

Ayers et al.

[11] Patent Number: 5,038,158

[45] Date of Patent: Aug. 6, 1991

[54] ELECTROMAGNETIC GRAY SCALE PRINTER

[75] Inventors: Robert W. Ayers, Olathe; Richard M. Kerbel, Shawnee, both of Kans.

[73] Assignee: Applied Resources, Inc., Overland Park, Kans.

[21] Appl. No.: 435,767

[22] Filed: Nov. 13, 1989

[51] Int. Cl.$^5$ .................... G01D 15/06; H04N 1/23
[52] U.S. Cl. ................... 346/153.1; 346/154; 358/300
[58] Field of Search ............ 355/202, 244, 245, 246, 355/305; 358/298, 300; 346/153.1, 157

[56] References Cited

U.S. PATENT DOCUMENTS

| | | | |
|---|---|---|---|
| 4,357,901 | 11/1982 | Fagen et al. | 355/246 X |
| 4,760,410 | 7/1988 | Kishi | 346/153.1 |
| 4,814,886 | 3/1989 | Kuge et al. | 358/298 X |

Primary Examiner—Donald A. Griffin
Attorney, Agent, or Firm—D. A. N. Chase

[57] ABSTRACT

A gray scale image poster printer reproduces a digitally stored bit map image on a printer using an electrostatic and magnetic toner to generate gray scale images by expanding each line of the original stored image into a plurality of subpixels along the horizontal scanning lines and by synchronizing the printing of the subpixel lines with a changing magnetic field that changes the amount of toner deposited in each subpixel.

9 Claims, 6 Drawing Sheets

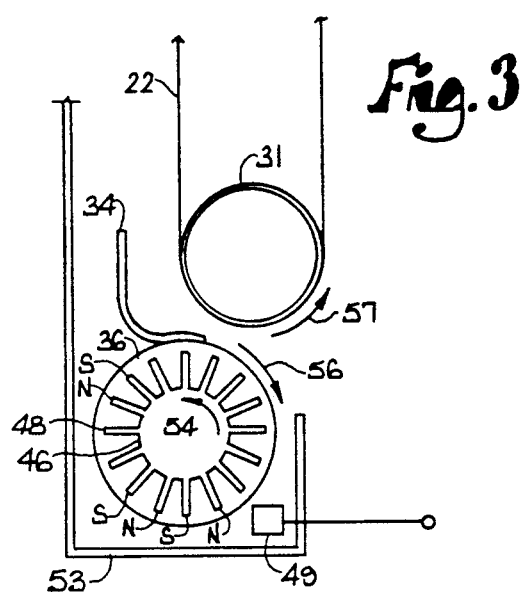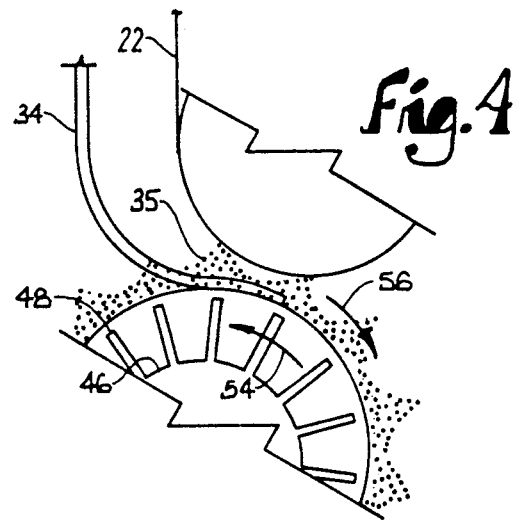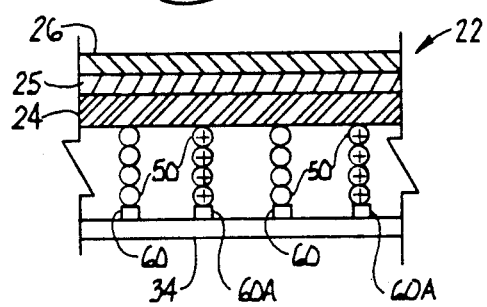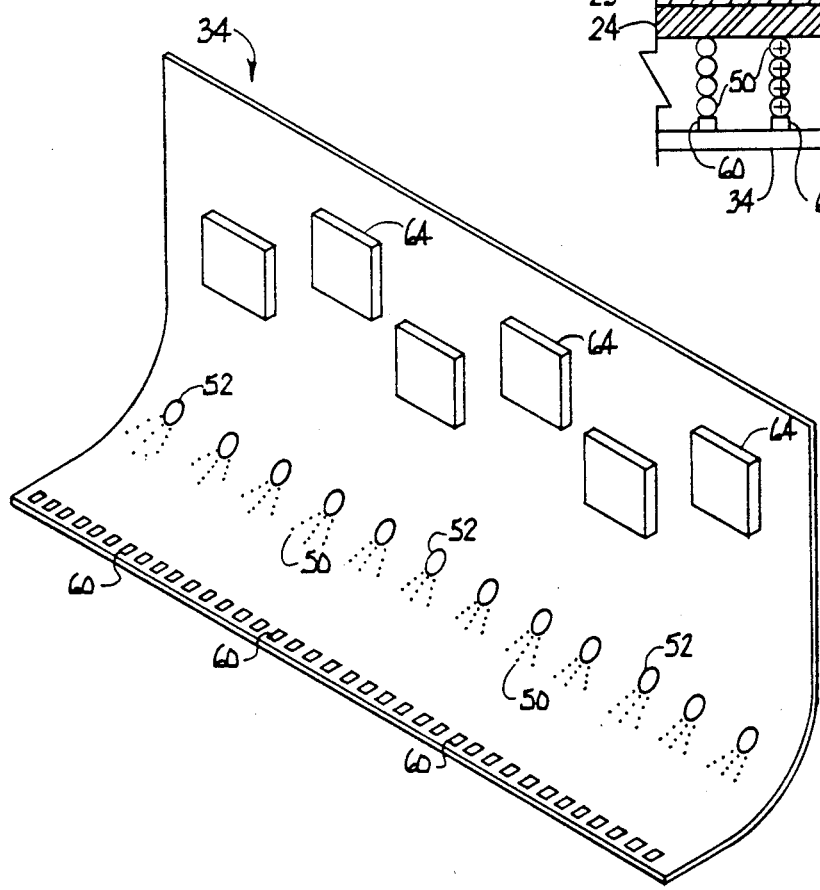

SET DIVIDED BY FOUR

A. SCAN LINES (FROM P.C.)

B. SYNCH. SIGNAL

C. GATED SCAN LINE

D. HALL EFFECT PULSE

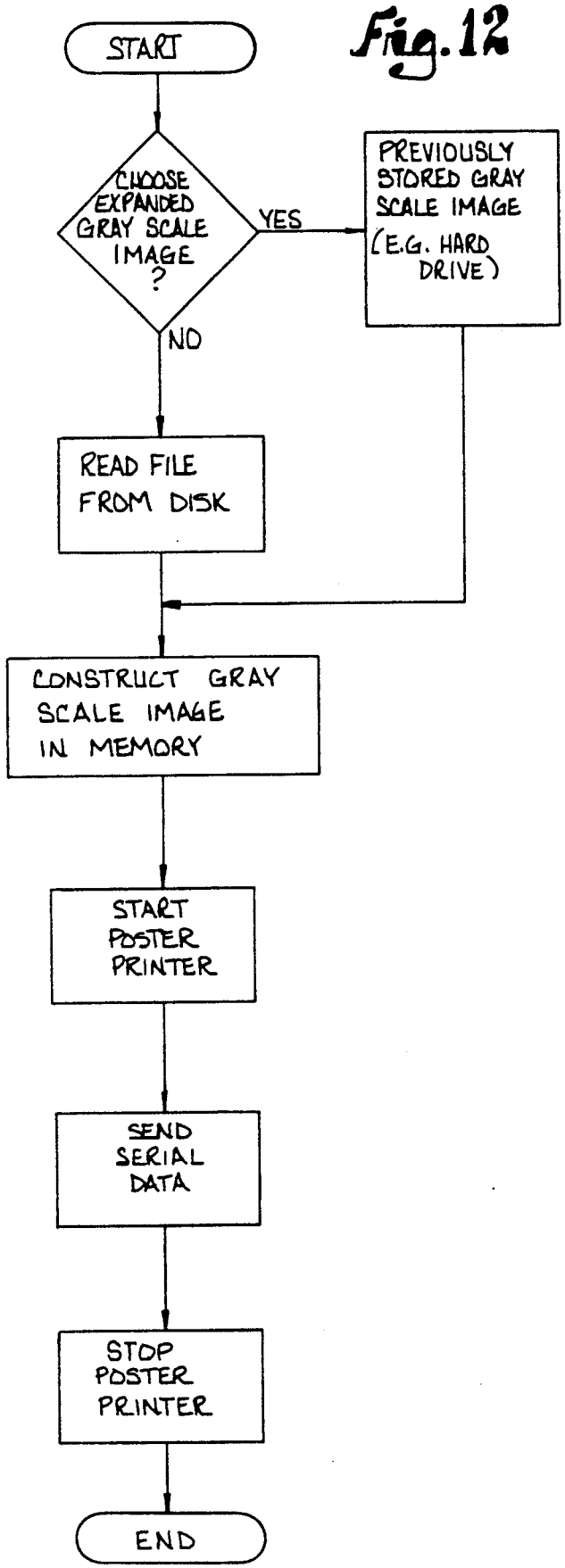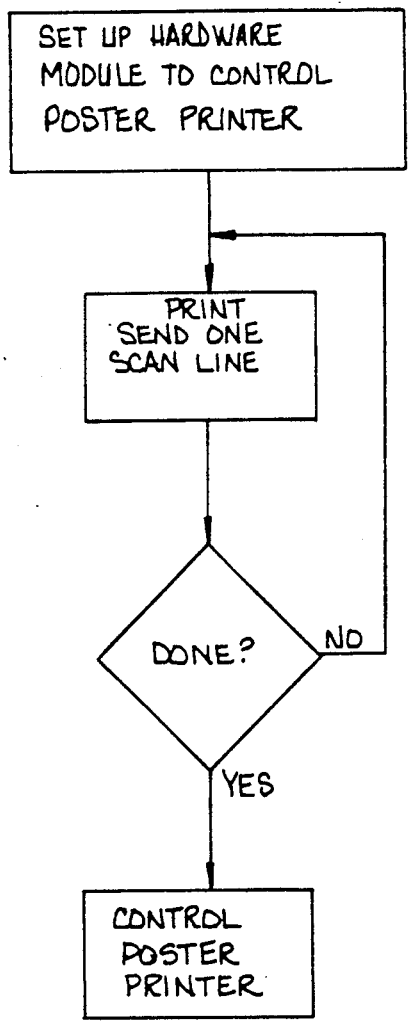

ELECTROMAGNETIC GRAY SCALE PRINTER

BACKGROUND OF THE INVENTION

1. The Field of the Invention

The present invention is directed to the reproduction of temporary gray scale images on a poster sized display. More particularly, the present invention is directed to a poster printer that converts digital data into gray scale images using an electrostatic and magnetic toner deposited on an electrostatic background.

2. The Prior Art

Oral presentations to groups of people are often enhanced by including display graphics that the entire group can see. Numerous means for developing and presenting graphics have been developed. These include, e.g., the chalkboard, the marker board, the large tablet, overhead projectors for transparencies or opaque media, slide projectors, movie projectors, video displays for still and moving pictures (often using data transmitted to a remote location by satellite), special screens adapted to transfer data from a computer screen to the projection surface of an overhead projector, flexible marker boards that produce a photocopy of any writing on the board, poster display boards that produce an image from digital data by using electrostatic toner to form the image on an electrostatic sheet, and many others. The mere variety of image display systems suggests that each has limited applications and serious drawbacks.

The chalkboard is expensive, heavy, bulky, messy to use and difficult to clean.

The marker board, a metallic board, usually with a white writing surface, is quite expensive, requires the use of special and expensive markers (available in colors) that give off toxic fumes, is messy and presents the danger of permanently staining clothes.

The large tablet is sometimes effective but is often not large enough for a group of significant size, is bulky and difficult to transport.

Moreover, the effectiveness of all of these three media depends directly on the skill and clarity of the writing and drawing of the user. None of them is especially well-suited to producing different shades of colors. None of them can reproduce images derived from digital data, or any other previously prepared images.

Overhead projectors require a screen or screen-like surface for projecting useful images. The screen is typically permanently mounted on a wall or free-standing tripod. Overhead projectors are often used to project the direct writings of the user, and so their effectiveness often depends entirely on the skill of the user. Overhead projectors are also frequently used to project previously prepared permanent transparencies, to which the user can add his own comments and graphics. Such transparencies are expensive to produce and the blank transparency sheets themselves are expensive. Removing the marks left on them from one presentation in preparation for another is difficult and messy and is guaranteed to soil the user's hands and clothes. In addition, overhead projectors are bulky, noisy, and hot.

All of these display devices in ordinary use are limited to producing line drawings, i.e., solid lines, sometimes in color, on a contrasting background. In addition, none of these display devices can be utilized to create images from digital data readily.

Slide projectors are often used in polished presentations, but slide shows are notoriously expensive to produce notwithstanding modern computer techniques that reduce their cost. Typically, a very long lead time is required to produce them. A good projection screen is absolutely required for a good presentation. Movie projectors suffer from the same disadvantages, but producing serviceable movies is naturally much more difficult and expensive than producing slide shows. In addition, more skill is required to operate a movie projector than a slide projector. Movies are also difficult to store and transport, as is the projection equipment, and difficult to edit or change.

Video tape presentations have replaced movies in many applications. Producing video tapes is simpler and less expensive than producing movies, but video tape images are lower quality.

Slides, movies, and video tape are all generally limited to previously prepared material, usually prepared well in advance of the presentation and cannot be readily changed during a presentation. Moreover, none of these display tools can be conventionally used to produce images directly from digital data. Computer generated images can be transferred into these media, but only through an intermediary step.

Video presentations from remote locations are currently used but their use is seriously restricted by high cost. These are typically used to allow a remote audience to view a speaker. These systems operate on analog originals and so are not adept at producing images from digital data.

Special screens for transferring the digitally coded images onto the projecting surface of an overhead projector are available. They may either create the display directly from digital data from a computer by emulating a conventional computer monitor, or may merely transfer the visual image from the monitor itself. These systems, however, naturally require an overhead projector and so their use is subject to many of the limitations of the overhead projector. They can produce gray scale images but require projected light.

So called poster printers, such as those currently manufactured by Canon, Inc., produce an image from digital data by using electrostatic toner to form an image on a flexible sheet. Like all the systems described above except videos, slides, and movies (which are projected light images), they cannot produce gray scale images. This limits their utility in a visually oriented society that increasingly appreciates the value and information available from images produced over a wide range of colors or tones.

Efforts to reproduce images emulating a gray scale on the poster printer have proven only marginally successful. For example, halftones, which print black dots of various sizes to emulate a gray scale, have long been used in newspaper photographs and the like where necessity dictates that the ink dots cannot be allowed to run together. The halftone technique reduces the resolution of the image significantly.

Another technique, called dithering, uses varying patterns of black and white to represent gray, concentrating black dots in dark areas and reducing their concentration in the lighter areas. Dithering also seriously reduces the resolution and information content of the images. The loss of resolution is particularly troublesome in large displays. Both the halftone technique and the dithering technique produce images that appear very harsh and incomplete to most viewers particularly when viewed at close range, although the image may appear to be good when viewed from a distance.

Accordingly, there is a need for a large display medium capable of readily producing gray scale images from any digital data from any source of digital data, such as a computer or facsimile machine whether local or remote.

SUMMARY OF THE INVENTION

Accordingly, it is a primary object of the present invention to provide a poster printer and a process that can produce gray scale images.

It is a further object of the present invention to provide a poster printer and process that can produce gray scale images directly from digital data.

It is a further object of the present invention to provide a poster printer and method that can produce gray scale images from digital data whether the data is produced locally or remotely.

A genuine gray scale reproduction results in a vastly improved image. Gray is an achromatic color made by blending or mixing black and white. Different shades of gray can be produced by varying the proportions of black and white. The gray scale is a range of ten discrete luminance values (1=pure white, 10=pure black) for evaluating the shading in black and white photographs and television or for exposure tests. The gray scale has been adopted from photography to computer graphics, in which it signifies the range of values that may be assigned to a pixel to indicate a shade of gray or black or white. In this document, the "gray scale" is an indication of a degree of shading of both individual pixels and the tones of the entire display. It does not necessarily refer to the full formal numerical standard gray scale, but is sharply contrasted with halftones and dithering.

Two different principles are harnessed to print gray scale images. First, each horizontal scanning line of an original digital image is divided into a plurality of subscanning lines, e.g., four to provide an "expanded image." The entire expanded image will occupy the same size as the original image when displayed on the poster printer. The subscanning lines also result in four subpixels for each original pixel. Different combinations of these four subscanning lines are printed with the electrostatic toner to achieve some gray scale in printing.

Second, the printing of the subscanning lines is coordinated or synchronized with the rotation of a rotating magnetic field, which is used to disperse the toner. The rotating magnetic field causes more toner to be available for printing at some times than at other times. Using this fact, the present invention prints darker subpixels when the magnetic field near, or adjacent to, the display sheet is strongest and the lighter shades of gray when the magnetic field is weakest.

Combining these two techniques leads to true gray scale images. The invention is explained in greater detail below.

BRIEF DESCRIPTION OF THE DRAWINGS

FIG. 3 is a schematic side elevation of the printing mechanism of the gray scale poster printer.

FIG. 4 is a schematic side elevation of the printing mechanism of the gray scale poster printer illustrating the presentation of toner for printing on the display sheet.

FIG. 5 is a schematic plan view of the interface between the print head and the display sheet illustrating the mechanics of deposition of toner on the display sheet.

FIG. 6 is an enlarged perspective view of a portion of the printer head illustrating toner dispersion.

FIG. 7 is a block diagram of the gray scale poster printer.

FIG. 12 is a flow chart illustrating operation of the computer software.

FIG. 13 is a flow chart expanding one important software module in FIG. 12.

DETAILED DESCRIPTION OF THE PREFERRED EMBODIMENT

Figure 1:
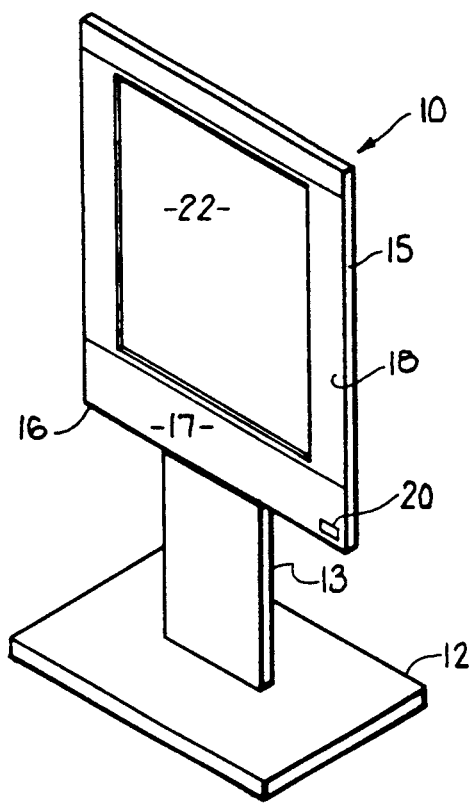
FIG. 1 is a perspective view of the gray scale poster printer.

Referring to FIG. 1, the gray scale poster printer 10 includes a base 12, a pedestal 14 attached to the base and a display unit 15, which may be used without the base 12 and pedestal 14, by hanging the display unit 15 on a wall. The display unit 15 includes an electromechanical control and printing unit 16 contained behind the front panel 17, a display board cover 18, which includes a transparent window over the display sheet 22 to prevent people from touching it. Also included is the display light emitting diode (LED) 22, which indicates whether the power is turned on and may be used to display certain error messages. The display unit 15 further comprises a sheet assembly 30 for supporting the sheet, comprising a frame and suitable supports for holding the ends of the top and bottom rollers 31 (FIG. 2) that the display sheet 22 rides on. Other digital printers or print medium may be used.

Figure 14:
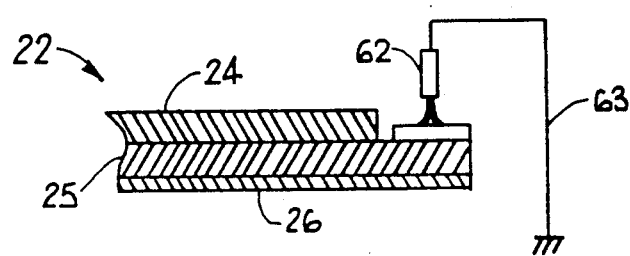
FIG. 14 is a schematic cross section of the display sheet illustrating the construction of the display sheet and the means for grounding it.

Referring to FIGS. 5 and 14, the display sheet 22 comprises three layers. The first layer is an electrically insulating layer 24, with a white outer surface, upon which the image is actually printed and displayed. Behind the viewing or display surface is the second layer, an electrically conducting layer 25 that is always maintained at electrical ground potential by the carbon brush 62 grounded through the lead 63, causing electrically charged particles of toner 50 to adhere to the surface of the display sheet 22. The third layer is a metallic film 26 for increasing the strength, durability and flexibility of the display sheet 22, which is thin and flexible. The three layers are bonded together through conventional means such as adhesives or heat bonding.

As is clear from FIG. 14, the insulating layer 24 is not as wide as the other two layers, enabling the carbon brush 62 to remain in contact with the conducting layer 25 at all times as the display sheet 22 moves past the carbon brush 62. The display sheet 22 is formed into a continuous loop or belt that moves upward during printing and is stationary as long as the user wants to display the image (See FIG. 2).

Figure 2:
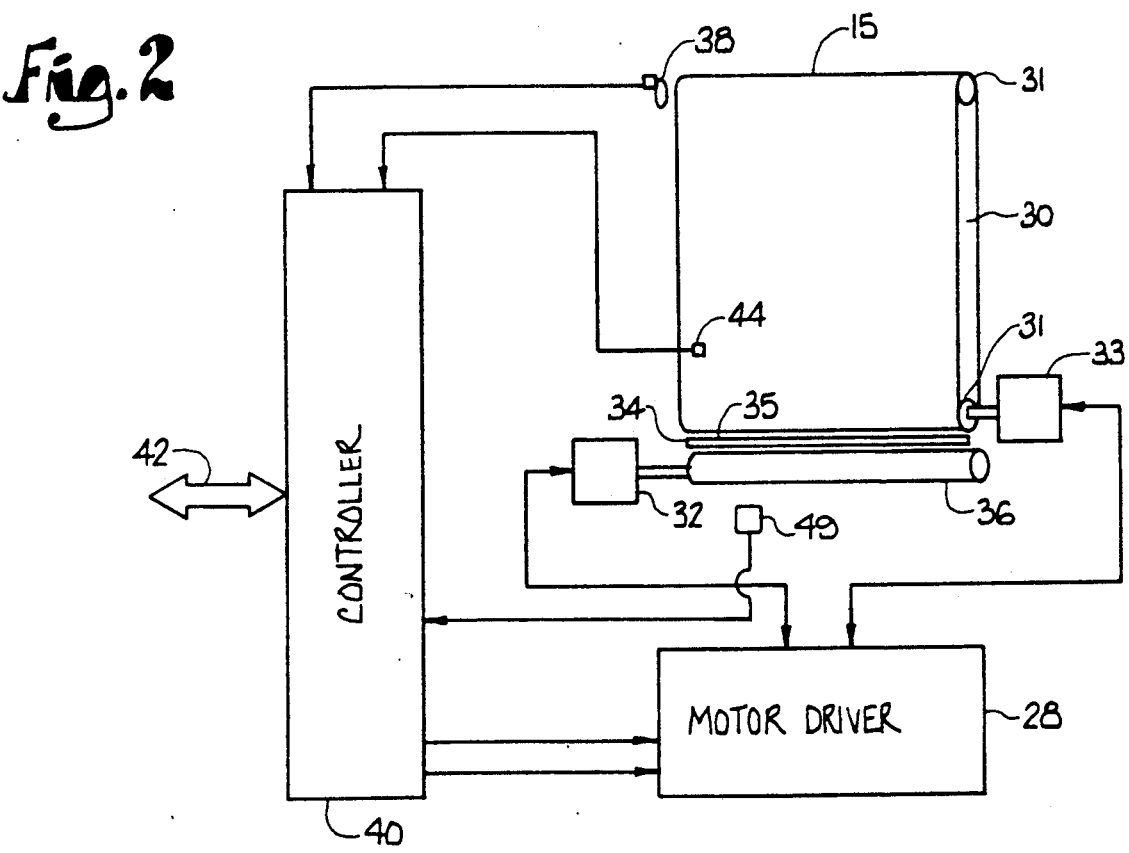
FIG. 2 is a schematic block diagram of the gray scale poster printer.
Figure 1:
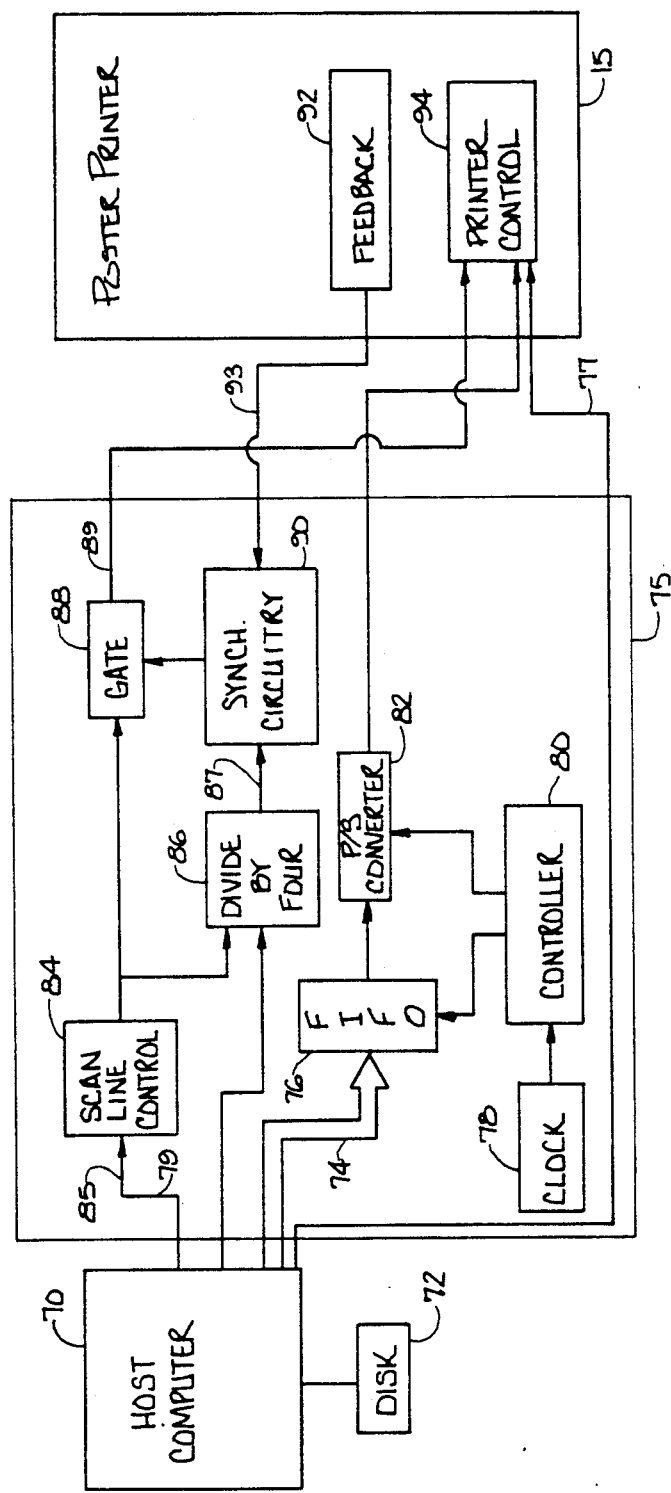

Referring to FIG. 2, the display unit 15 further comprises the top and bottom sheet rollers 31 for supporting and scrolling the display sheet 22. The motor driver 28 includes electronics for driving the developing roller motor 32 and the sheet feed motor 33. The printer head 34, best seen in FIG. 6, is located between the display sheet 22 and the developing cylinder 36 and runs across the width of the display sheet 22.

The sheet feed motor 33 controls the speed of the display sheet 22, which is constant during printing and which must be carefully controlled to generate an image with the desired aspect ratio (typically 1:1). The sheet sensor 38 detects the amount of movement of the display sheet 22 and feeds this information back to the poster printer control unit 40, which regulates the rate of travel of the display sheet 22. The poster printer control unit 40 also controls and processes the signals transmitted to the gray scale poster printer 10 from a separate digital image source transmitted along the serial data bus 42. The sheet home sensor 44 indexes the top of the display sheet 22 to the top of the display unit 15 by detecting the position of a small hole in the display sheet 22.

Referring to FIG. 3, the developing cylinder 36 is a stationary, hollow non-ferrous tube having an internal concentric agitator roller 46 having sixteen equally spaced outwardly projecting splines 48 that run the length of the agitator roller 46. Each spline 48 is magnetized, with the pole orientation alternating from one spline to the next, i.e., north, south, north, south, etc. Alternatively, the agitator roller 46 may be a cylinder with magnetized bar inserts aligned parallel to one another without projecting beyond the cylinder walls, or other suitable device. The toner 50 comprises very fine particles, typically black, that are affected by magnetic fields and also will adhere to a surface electrostatically. The toner is contained within the toner bin 53 where it is available for printing. The agitator roller 46 is rotated along its axis by the roller motor 32 and its speed of rotation is controlled by signals developed by the sheet assembly control unit 40. The agitator typically makes one complete revolution every 40 ms., with each complete cycle of the magnetic field, i.e., north pole to north pole, or south pole to south pole, taking about 5.0 msec. The alternating magnetic fields set up by the spines of the rotating agitator roller 46 cause the toner to churn and flow along the outer surface of the developing cylinder 36. Some of the toner 50 flows through a series of holes 52 along the base of the print head 34, where it is available to the display sheet 22 for printing.

Still referring to FIG. 3, the agitator roller 46 rotates in the director of the arrow 54, the toner flows in the opposite direction, as indicated by the arrow 56, and the display sheet 22 moves in the direction of the arrow 57. If the gray scale poster printer 10 is viewed from the front, the display sheet 22 moves from the bottom of the picture frame to the top, and the agitator roller 46 rotates from the bottom to the top.

Referring to FIG. 4 it is apparent that the toner 50 does not flow through the holes 52 at a uniform rate, but in amounts that depend on the location of the splines 48. The toner 50 rises further above the developing cylinder 36 at the points where the magnetic fields or flux are strongest, i.e., at the location of any of the sixteen splines 48. When the magnetic flux, whether from the north poles or south poles (i.e., magnetic polarity is irrelevant) is strongest in the interface 35 adjacent to the bottom of the display sheet 22, more toner will be deposited on the display sheet 22, making a darker image. This phenomenon, properly harnessed, enables the gray scale poster printer 10 to print genuine gray scale images. The bulges or lines of increased toner concentration caused by the rotating magnetic field naturally move and shift about the circumference of the developing cylinder 36 as the agitator roller 46 rotates.

Referring to FIG. 6, the print head includes 1,680 fine wire electrodes 60. The electrodes 60 are parallel to one another and are evenly distributed across the printing edge of the print head 34 (See FIG. 6), terminating along the edge of the print head 34. Each electrode 60 represents one horizontal picture element or pixel. Each electrode 60 is separately addressable by the controller board 45 (See FIG. 2). As a practical matter, the number of horizontal picture elements, or pixels, is fixed at 1,680 and cannot be expanded by the techniques discussed below.

When a positive voltage is applied to an electrode 60 the electrode is said to be on and when no voltage is applied the electrode is "off." When a positive voltage is applied to an electrode 60, an electrical field is created at the tip of the electrode 60, which charges the nearby toner particles with a positive electrical charge. There is essentially no current through any electrode 60 because none of them is part of a complete electrical circuit. The charged particles of toner 50 adhere to the display sheet 22, which is grounded. The adhered toner 50 makes that area of the display sheet 22 black. When an electrode 60 is turned off, no toner adheres to the display sheet 22 in that area, and so the display remains white. For example, as shown in FIG. 5, the two electrodes 60A are turned on and the remaining electrodes 60 are turned off. Therefore, only the toner particles directly between the electrodes 60A and the display sheet 22 adhere to it. Toner particles between the electrodes 60 and the display sheet 22 do not adhere to it because they are not charged.

That is, a positive voltage signal to an electrode 60 results in a black image for that pixel and 0 volts results in a white image for that pixel. The height of each pixel depends on how far the display sheet moves during printing of one horizontal line. Each electrode 60 is separately turned on or off for each horizontal scanning line. As is discussed in detail below, it is also possible to deposit a lesser or greater amount of toner onto a pixel, rendering it varying shades of gray because the toner covers the white display sheet more or less thoroughly through a specific synchronization of the printing operation with the rotation of the agitator roller 46.

Figure 15:
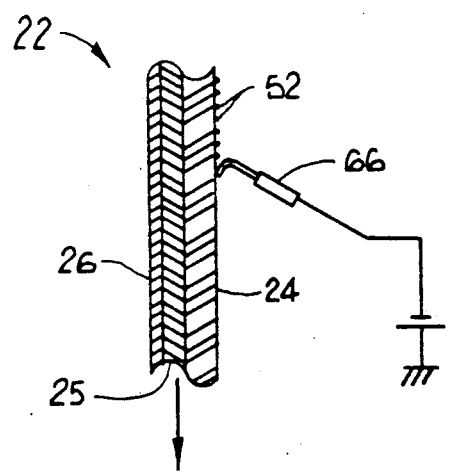
FIG. 15 is a schematic cross section of the downward moving portion of the display sheet showing how an image is removed.

The image displayed is intended to be temporary. Only one screen, i.e., one full frame, which may include more than one separate image, can be displayed at one time. Alternatively, the back of the poster printer may be equipped with a window, like the front, the cleaning brush moved to the bottom of the display sheet and two full screens provided, one on the front of the display sheet 22 and one on the rear of the display sheet 22. Naturally, the image for display on the back must be transmitted and printed upside-down. It is intended that when that screen has been presented long enough to meet the needs of the audience, the display sheet will be moved, the currently displayed image will wrap around to the back of the gray scale poster printer 10 and a new image will be printed on the display side of the display sheet 22. The old image must be removed to permit a new image to be clearly printed when the display sheet 22 is cycled again. Referring to FIG. 15, the cleaning brush 66 is fixed on a frame member of the gray scale poster printer 10 such that it is always in contact with the insulation layer 25, or display surface. The cleaning brush 66, which extends across the width of the display sheet 22, is maintained at a negative 3 volts static bias potential. As the image moves past the cleaning brush 66, the negative electrical potential of the cleaning brush 66 removes the static electricity from the toner 50 particles, which can then no longer adhere to the display sheet 22. Consequently, the toner 50 particles fall off the display sheet and back into the toner bin 53, where they are ready for reuse.

An image may remain on the display sheet 22 for viewing for days when the gray scale poster printer 10 is turned off because the toner 50 particles are very fine, very light weight, hold a static electricity charge well, and readily adhere to the display sheet 22. The time an image may be preserved depends on such factors as temperature and humidity. Normally, however, the image is intended only for temporary display.

Referring to FIG. 6, the electrodes 60 are clearly shown along the edge of the print head 34 that is presented to the display sheet 22, as are the holes 52 through which the toner 50 passes. The toner 50 then slides down across the metal surface of the print head 34 and across the electrodes 60. If an electrode is turned on, the toner 50 passing over that electrode is electrically charged and adheres to the display sheet 22. Otherwise the toner particles merely fall back into the toner bin 53. Each electrode 60 is turned on or off by the electrode drivers 64 comprising appropriate integrated circuits, acting on digital signals transmitted from the sheet assembly control unit 40. The digital signals map the image to be printed on the display sheet 22.

The largest image the poster printer can display is about 23.8 inches wide by 33.9 inches high (60.5 cm wide by 6.1 cm high)(a "full frame image"), with 1,680 vertical lines, i.e., the number of electrodes 60 in the print head 34, and 2,391 horizontal lines of, i.e, the number of times each electrode 60 is intended to be turned on and off during the printing of a full frame image, which is about 4,016,880 pixels. Thus, there are 70.58 dots per inch (dpi) per horizontal line (180 dpcm) and 70.5 dpi per scanning line (180 dpcm). The resolution of the poster printer as thus configured is about 72 dpi. By comparison, a conventional facsimile machine has a resolution of about 200 dpi (508 dpcm), a conventional office laser printer has a resolution of about 300 dpi (762 dpcm), and offset printing has a resolution of at least about 3,000 dpi (7,620 dpcm).

A full frame image is generated in about 9.2 seconds from the time the start display command is received by the poster printer until the display sheet stops and the full frame image is displayed. The print time, however, is about 2.74 milliseconds (msec) per horizontal scanning line, or about 6.55 seconds of actual printing time. The display sheet, then, moves upward at about 5.2 in/sec (13.2 cm/sec) during printing. Each horizontal scanning line is printed in about 2.74 msec, to yield an image with a 1:1 aspect ratio for black and white. Gray scale lines of an original image are printed about every 2.5 msec, causing very slight distortion of the image. This can readily be altered to provide an aspect ratio of 1:1 by changing and controlling the rate of rotation of the agitator roller 46 to permit faster line printing.

As described to this point, the poster printer is restricted to printing black and white images. Gray scale images cannot be printed but can only be emulated by techniques such as halftones or dithering. The circuitry of the poster printer itself is designed to reproduce a black and white digitally mapped image from an outside source, such as a conventional image scanner. If, however, a gray scale image is displayed on the poster printer in black and white, the gray scale information is lost.

Conventional scanners for scanning and storing images into a computer memory, whether a personal computer, minicomputer, or mainframe, can scan and save gray scale black and white images. Typically, the user can select the number of tones of gray that will be stored. Naturally, the greater the number of gray scale tones, the more computer memory is used and the longer it takes to manipulate, store and recall the image. Images read and stored by a conventional scanner may require anywhere from 1 to 15 bits/pixel.

The stored gray scale image is reproduced on the gray scale poster printer 10 by (1) expanding the number of horizontal scanning lines found in the original image by a predetermined integer amount to generate a number of subscanning lines within each normal horizontal scanning line, and, (2) coordinating the printing of each horizontal subscanning line with the rise and fall of the strength of the magnetic field set up in the toner bin 53 at the interface between the display sheet 22 and the print head 34 ("interface 35"). Black tones are printed when the magnetic field at that point is strongest, dark or medium grays are printed when the field is less strong because a pole of the magnetized agitator roller 46 is farther from the interface 35, and light gray where the magnetic field is weakest. This coordination results in varying amounts of toner 50 adhering to the display sheet 22, resulting in actually different gray scale tones being deposited on the display sheet 22. There follows a detailed description of the electrical hardware and computer software for achieving this function.

A Hall effect sensor 49, such as a Hall device, or a Hall probe, (FIG. 3), or other sensor that generates a signal indicative of the alternating magnetic field established by the rotating agitator roller 46, generates an electrical signal that maps the changing magnetic field within the toner bin 53. The changing magnetic field produces an electrical sine wave that becomes nearly a square ware due to the Hall effect and is squared-up by a Schmidt trigger or similar circuit and then used in a digital circuit.

Referring to FIG. 7, there is shown a block diagram of the gray scale poster printer 10 comprising the display unit 15 on the right, the host computer 70 with the associated hard disk 72 or other suitable data storage device, and, in between these two units, the interface card 75. The host computer is an IBM PS/2 Model 70 running under the MS-DOS 4.0 operating system from Microsoft corporation and employing DOS extended memory to address a total of at least 3 megabytes of internal random access memory (RAM). Implementing the gray scale poster printer 10 probably requires a computer having at least the power of an IBM AT personal computer.

The image to be displayed is stored in a tagged image format file (TIFF), a standard image storage format for digital storage of images. The TIFF file includes a header with data about the image and how it was stored, such as the size of the image, whether it was stored in gray scale or not, whether the data was compressed and other factors, as well as the bit map of the image itself. The image may also be stored in an extended postscript storage notation (EPSN), or other suitable format. These formats store gray scale images in the computer's main memory or an auxiliary storage device. Images from any other digital source may also be used, e.g., facsimile machines or scanners. Fundamentally, the image file required is a video bit map with a header.

The interface card 75 consists entirely of hardware and the necessary connections. The software resides entirely within the host computer 70.

Still referring to FIG. 7, the interface card 75 includes the data bus for transferring data from the parallel port of the host computer 70 to the first-in-first-out (FIFO) memory unit, which allows the poster printer to receive data at a constant rate. The serial port of the host computer 70 could be used if it could transfer data quickly enough, but in the computer used here, as in most personal computers, the serial port will not transfer data out at the 1-3 megabits/sec. required to drive the poster printer display unit 15 at an acceptable rate. Another alternative is to employ a FIFO or other memory unit with enough capacity to store the entire image from the computer so that no data transfer from the host computer 70 to the FIFO 76 is required during printing.

Figure 8:
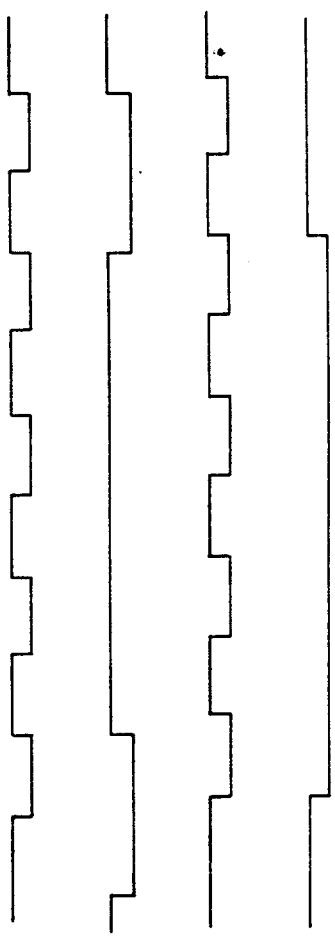
FIG. 8 is a chart illustrating the important timing signals used in the gray scale poster printer.

The data from the FIFO memory 76 is transmitted to the parallel-to-serial (P/S) converter 82, which converts the parallel data signal to a serial bit stream. The bit stream does not include control bits at the beginning and and end of a transmitted byte. The resulting serial bit stream is transmitted directly to the printer control 94 of the poster printer display unit 15, where it is converted to the off-and-on electrical states in the electrodes 60 that are required to print an image, as discussed above. In its present configuration, the poster printer display unit 15 can only receive a single bit at a time, so serial data transfer is required. Parallel data streams could be employed, and would require changes in the interface card 75 and the software, but the same principals of operation set forth below could be used. The clock 78, driven by a crystal controlled oscillator, drives the controller 80 which generates the appropriate timing signals, as illustrated in FIG. 8 and discussed below.

To print a black and white image, the host computer 70 sets the divide by four 86 to binary one. The host computer 70 initiates printing by sending the print control line 77 (FIG. 7) low, signaling the poster printer to start the agitator roller 46, and the sheet feed motor, which moves the display sheet 22. When the display sheet 22 reaches the proper initial position as signalled by the sheet home sensor 44, the host computer 70 transmits data to the FIFO 76, filling it with data for the first horizontal scan line. The host computer 70 then takes the scan line control line 79 low, from the normal high state, which is transmitted through the scan line control 84 and the gate 88 to the poster printer without modification. The FIFO 76 and the parallel to serial converter 82 then begin transmitting serial data for the first scan line to the poster printer. The data is clocked by a signal generated in the clock circuit 78 and transmitted along with the serial data. When 1,680 data bits (pixels) have been transmitted, the scan line control signal to the poster printer goes high to signify the end of the serial data for that scan line. The scan line control signal is held high until the desired scan line time is reached, i.e., typically 2.5 msec. Then the scan line control signal is brought low again to begin transmission of the next line of data. This process is repeated until 2,391 scan lines have been transmitted. Then the print control line 77 is brought high and the poster printer stops both of its motors 32, 33.

In the case of printing gray scale images, the same process is followed, but the host computer 70 is required to transmit a plurality of horizontal scanning lines for each original horizontal scanning line. In this example, four horizontal subscanning lines are employed and are synchronized to the rotation of the agitator roller 46.

The number of horizontal scanning lines from the computer will be some predetermined multiple of the number of horizontal scanning lines in the original stored image, e.g., four, which is also the same multiple of the number of horizontal scanning lines that the poster printer display unit 15 is designed to accommodate to reproduce the original image and the original aspect ratio.

One key to the ability to print gray scales on the gray scale poster printer 10 is to divide each original horizontal scanning line into a multiple of smaller horizontal subscanning lines. Thus, in this case, it is desired to send four times as many horizontal scanning lines to the poster printer display unit 15 as it would normally receive. This naturally requires turning the electrodes on and off four times faster than normal transmission would require. Normal transmission requires about 2.5-2.74 msec/scan line. This, in turn, requires supplying data to the print head at four times the normal rate of 2.5 msec per line, or 2.5 mHz instead of the normal 621 kHz. The higher electrode switching rate has not posed any difficulties.

Referring to FIG. 7, the host computer 70 starts the printing cycle by activating the divide by four 86, which in turn activates the sync circuitry 90. The print control line 77 is brought low and the poster printer starts its motors in response. The host computer 70 fills the FIFO 76 with data for the first subscanning line, and takes the scan line control line 77 low, signaling the start of data transmission.

The scan line start signal from line 79, however, is blocked from reaching the poster printer by gate 88 which is closed in response to the activation of the divide by four 86 and synch circuitry 90. When a signal from the agitator roller 46 is received by the synch circuitry 90, the gate 88 is enabled and the scan line start signal is transmitted to the poster printer. The data for the first subscanning line is clocked out through the parallel to serial converter 82. When the line has been transmitted, the scan line signal goes high for a predetermined length of time to get the desired scan line frequency. The next three subscanning lines are transmitted by the host computer 70, through the FIFO 76 without interference from the synch circuitry 90 because the divide by four 86 is counting scanning lines and will not enable the synch circuitry 90 again until after four subscanning lines have been transmitted.

After the fourth subscanning line is transmitted, the divide by four 86 activates the synch circuitry 90, which again blocks transmission of the scan line start signal to the poster printer by closing the gate 88 until another signal from the agitator roller 46 is received. The general effect is that every fourth subscanning line is not transmitted to the poster printer until a pulse from the agitator roller 46 is received by the host computer 70, indicating a maximum magnetic field strength at the interface 35 between the display sheet 22 and the print head 34.

Still referring to FIG. 7, the feedback unit 92, i.e., the Hall effect sensor 49 (FIG. 3), generates a nearly square wave that is transmitted along lead 93 to the synchronization circuitry 90, which squares up the signal in a Schmidt trigger. The divide by four 86 divides the number of scanning lines as counted by the scan line control 84 by 4 and delivers this information to the synchronization circuitry 90. The scan line control 84 will count four times as many horizontal lines as the original image has because the software, described below, has expanded each original horizontal line into four horizontal lines one-fourth as high. This greater number of lines must be divided by four to generate a signal that ensures a proper aspect ratio and permitting coordination of printing with the rotation of the agitator roller 46.

This synchronizes the printing function with the rise and fall of the magnetic field strength at the interface 35 (See FIG. 4). This synchronization permits certain mapping functions, implemented in software and described below, to be used to achieve gray scale printing.

Referring to FIG. 8, certain timing signals must be transmitted to various circuit elements on the interface card 75. The most important of these are illustrated in FIG. 8. Signal A is generated in the host computer 70 and indicates the number of horizontal scanning lines being read from the expanded image in the computer and appears on lead 85. The synchronization signal B is the output of the divide by four 86 and appears on lead 87. Signal C is the gated scan line pulse signal and appears on the gate 88 output along lead 89. Finally, signal D, the agitator roller pulse signal from the Hall effect sensor 49 indicates when the magnetic field at the interface 35 is at maximum strength and appears on lead 93 as an input to the synchronization circuitry 90. For clarity, signal D is shown after squaring up. Both the falling and rising edges of these signals are used to trigger events in the present embodiment. That is, each time a north or south magnetic pole is presented to the interface 35, printing of one of the subscanning lines is initiated (typically the first subscanning line). Alternatively, the rising edge only could be used and a total of eight subscanning lines printed prior to synchronizing on another rising edge of the Hall effect signal. Naturally the falling edge of this signal could also be used. There are any number of methods and precise embodiments that can be employed to synchronize the changes in the magnetic field in the interface 35 with the printing of an image on the poster printer. Certain small delays in some timing signals may be desirable to ensure that signals can be processed properly.

Referring to FIG. 12, there is shown the flow chart for the basic program of the software. The software was written primarily in C, with some portions of the software written in machine language. Because the software may be implemented in many different languages to suit user needs and available equipment, the flow charts are thought to provide a better disclosure than a program listing would.

The software prompts the user to choose a previously stored expanded gray scale image that has already been stored with a multiple of the original number of scan lines. If the response is yes the software reads the expanded image from a storage disk or other outside file. If the answer is no, the software reads the normal image into the computer memory from the disk 72. Then the software constructs the expanded gray scale image in memory according to a mapping routine discussed in detail in conjunction with FIGS. 10, 11.

The next program routine starts the poster printer, triggering the "send serial data" routine, which transmits the serial data that maps the image to the poster printer. At the end of the transmission, signals trailing the data trigger the "stop poster printer" routine and stop the printer. The program then reaches "end," which stops the program. The software, having enabled the poster printer to reproduce the desired image, is finished and does nothing further until another image is called by the user.

Referring to FIG. 13, there is shown a more detailed flow chart for the "send serial data" routine and the subsequent routines of the software. The first subroutine, "set up hardware module to control poster printer," causes the host computer 70 to send appropriate initializing control signals to the interface card 75 circuits. Then the routine moves to the "print: send one scan line" subroutine, which transmits one scan line through the circuitry of the interface card 75, as discussed above, and to the poster printer display unit 15, which prints it. The next subroutine, "done?," causes the "print: send one scan line" subroutine to repeat until a "done" signal is detected. When the image transmission is finished, the routine exits to the "control poster printer subroutine," which signals the poster printer to stop printing and scrolling.

The "construct gray scale image in memory" routine of the main program employs a legend to translate the stored original gray scale image into an expanded gray scale image. This routine constructs the expanded bit map in memory. Gray scales having different numbers of distinguishable tones of gray require different degrees of expansion of the original image Four levels of gray tones can be achieved by providing two scan lines in the expanded image for every line in the original image. Eights levels of gray tones require expanding each scanning line of the original into three lines. Sixteen gray levels can be achieved by expanding each line of the original image into four lines, and, thirty-two levels of gray can be achieved by expanding each scan line of the original into five scan lines. Each increase of one additional expanded scan line doubles the number of gray tones that are theoretically available. As a practical matter, some of these gray tones may not be distinguishable at a distance.

Figure 10A:
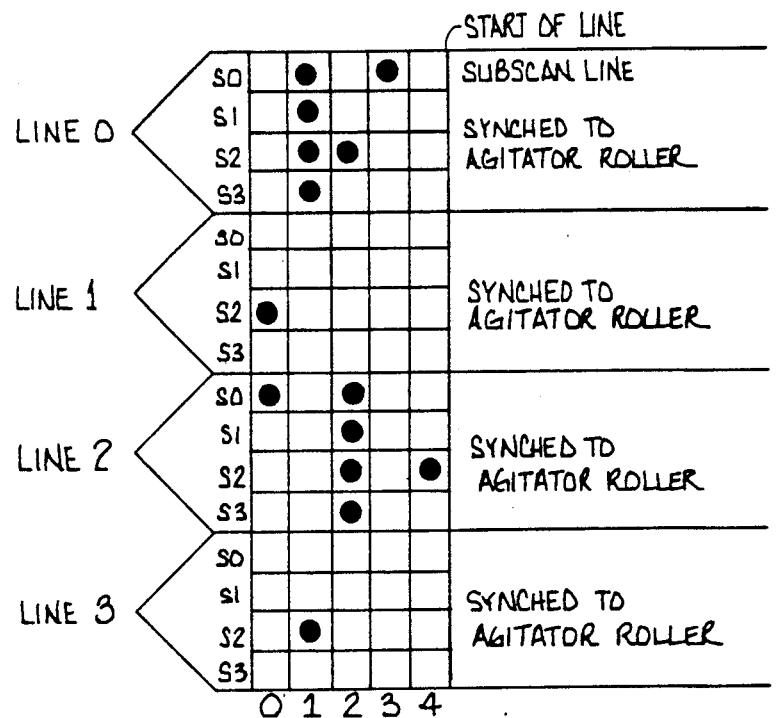
FIG. 10A is a schematic diagram showing the actual mapping of a portion of an original image (FIG. 9A) into the expanded gray scale printer poster display.
Figure 11:
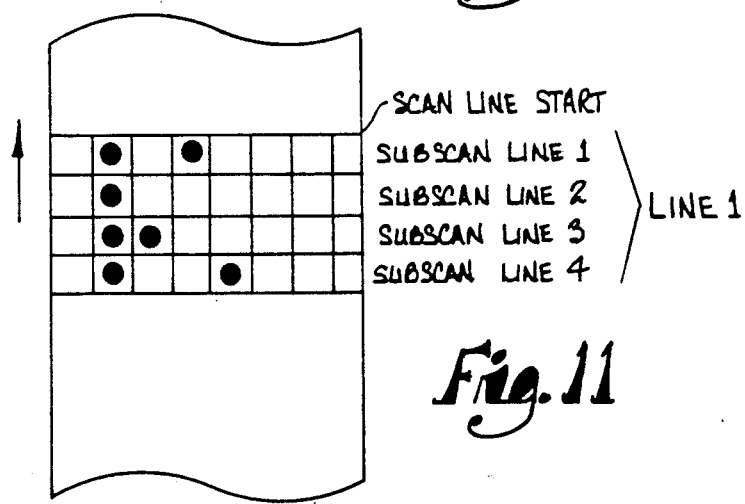
FIG. 11 is a schematic diagram illustrating the deposition of variable amounts of toner onto the display sheet within an expanded horizontal line of subpixels constructed from an original horizontal line one pixel high to achieve a gray scale image.

The software of the construct gray scale image in memory routine implements the process described immediately below. In general, the gray scale image is created by depositing toner into different subpixels to represent different gray tones. Referring to FIG. 10A, each line of the original image is expanded into four sublines one-fourth as high as the original line. Black is represented by depositing toner in all four subpixels (e.g., line 0, column 1). White is represented by not depositing toner in any subpixel (e.g., line 1, columns 1, 2 and 4). Dark gray is represented by depositing toner in the two center subpixels of a line (e.g., line 1, column 3). Medium gray is represented by depositing toner in the two outside subpixels of a line (e.g., line 3, column 3). Light gray is represented by depositing toner in either one of the two outer subpixels of a line (e.g., line 0, column 3; or line 3, column 1). An intermediate tone can be achieved by depositing toner in either pair of subpixels consisting of an outer subpixel and an inner subpixel (e.g., line 2, column 3, or line 2, column 1).

If the process just described were the only means for representing gray scale images in embodiment of the poster printer, the display might be thought to resemble halftone reproduction more than gray scale reproduction. As discussed above, however, and as illustrated graphically in FIG. 11, the amount of toner deposited in each subpixel depends on the position of the agitator roller 46 within the developing roller 36 and is coordinated therewith. The coordination of these two techniques results in true gray scale image reproduction. Either of these two techniques could be used alone to achieve a finer graphic image that printing only in black and white. Superior results are, however, achieved when they are combined.

Figure 9A:
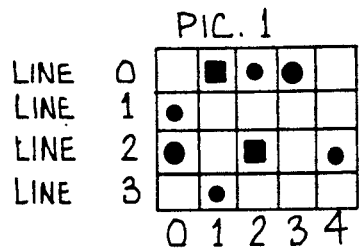
FIG. 9A is a schematic diagram showing a greatly enlarged small portion of a digitally stored gray scale image.
Figure 9B:
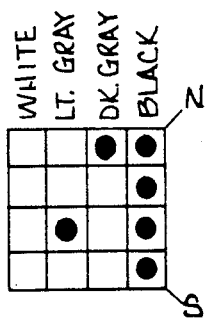
FIG. 9B is an explanatory legend.

Referring to FIG. 9A, there is shown a fragment of a gray scale image stored as a digital bit map. Each square in FIG. 9A represents one pixel of the stored image. The gray tones are represented by the figures in the legend shown in FIG. 9B. Specifically, e.g., line 0, column 0 of FIG. 9A is white; line 0, column 1 is black; line 0, column 2 is light gray; line 0, column 3 is dark gray; line 0, column 4 is white and line 3, column 1 is light gray. The remaining pixels shown in FIG. 9A are read according to the same code.

Then an image, such as that shown in FIG. 9A, is expanded by the software in the "construct gray scale image in memory" routine so that each line of the original image is represented by four subscan lines as shown in FIG. 10A. Each of the four subscan lines into which each horizontal scanning line of the original image is broken is only one-fourth as high as the original scanning line, so that no resolution is lost in this process. The gray scale poster printer 10 should have the same resolution as the original image.

Figure 10B:
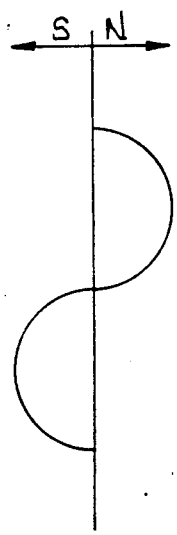
FIG. 10B is an explanatory legend.

Referring to FIG. 10A, line 0 corresponds to line 0 of FIG. 9A. Line 0, column 0 of FIG. 9A is expanded into the subpixels S0, S1, S2, and S3 of column 0, which in this case is white so all subpixels of FIG. 10A, line 0 are white. Moving to line 0, column 1 of FIG. 9A, this pixel is registered by printing a black dot in all four subpixels, as shown in FIG. 10A, line 0, column 1. As another example, the light gray of line 2, column 4, shown in FIG. 9A, is mapped into a single subpixel dot shown in line 2, S2, column 4 of FIG. 10A, showing only one subpixel of the four possible subpixels. Referring to FIG. 10B, the legend or map for mapping images into the expanded gray scale image illustrated in FIG. 10A shows that white is represented by blank pixels, light gray is represented by one dot in one of the interior subpixels of the four subpixel array; dark gray is shown by one subpixel along the top edge of the four subpixels; and black is represented by a dot in each of the four subpixels of a pixel. Alternatively, dark gray could be represented by a dot in the bottom subpixel. The "N" and "S" indicate maximum magnetic field strength at the start and the end of each pixel.

If the pixels of the original image were merely mapped into the subpixel domain, the resulting displayed image would not be a true gray scale, but would be similar to halftone techniques. As discussed above, however, and illustrated in FIG. 11, the varying strength of the magnetic field caused by the rotating agitator roller 46 causes the toner pattern to bulge upwardly at the interface 35 between the print head and the display sheet. The software and hardware described herein use this fact to cause a greater amount of toner to be deposited in subpixels 2 and 3 of FIG. 11 than for any other subpixel, making these two subpixels especially dark. A weaker magnetic field is present when subpixel 1 and subpixel 4 are printed, resulting in less toner adhering to the display sheet 22. The varying magnetic field is illustrated by the sine wave in the left-hand portion of FIG. 11, maximum field strength occurring at the center of the pixel (subpixels 2 and 3). This exemplary representation can represent at least the following shades, white, black, dark gray (in subpixels 2 and 3), medium gray (subpixel 2 or 3,) and light gray (subpixel 1 or 4).

While certain forms of the invention have been illustrated and described, the invention is not limited to those embodiments, except insofar as the limitations are included in the following claims.

Having thus described the invention, what is claimed as new and desired to be secured by Letters Patent is:

1. A process for printing an image comprising:
   (a) transmitting digital data to a printer that constructs images from digital data;
   (b) sensing the strength of a changing, recurring magnetic field adjacent to a print medium; and
   (c) periodically synchronizing the printing of a line on said medium with changes in the magnetic field as sensed in step (b), by responding to periodic occurrences of a predetermined strength of the changing magnetic field to effect said synchronization.

2. The process as set forth in claim 1 further comprising the step of creating an expanded image in which each line of the original image is divided into a plurality of sublines to create a set of sublines for each line of the original image.

3. The process as set forth in claim 2 wherein said synchronizing step (c) further comprises synchronizing printing once for the printing of each said set of sublines.

4. The process as set forth in claim 1 wherein the changing magnetic field is bipolar and said synchronizing step (c) further includes responding to the polarity of the changing magnetic field to synchronize said printing.

5. The process as set forth in claim 1 further comprising the step of dispersing a toner adjacent said print medium in response to said magnetic field.

6. An apparatus for printing images comprising:
   a poster printer having a display sheet, means for receiving a digital image, and means for printing an image on said display sheet,
   a computer and means for expanding each pixel of said digital image into a plurality of subpixels to create an expanded image,
   means for mapping the color tone of each pixel of said digital image into the corresponding subpixels of said expanded image, and
   said printing means comprising an agitator roller having a plurality of lengthwise projecting magnetized splines of alternating polarity for dispersing a toner and means for coordinating the disposition of toner on said display sheet during printing with the changes in the magnetic field caused by rotating said agitator roller.

7. An apparatus for printing images comprising:

a poster printer having a display sheet, means for receiving a digital image, and means for printing an image on said display sheet, a computer and means for expanding said pixel of said digital image into a plurality of subpixels to create an expanded image, means for mapping the color tone of each pixel of said digital image into the corresponding subpixels of said expanded image, and said printing means comprising means for producing a changing, recurring magnetic field for dispersing a toner and means for coordinating the disposition of toner on said display sheet during printing with the changes in said magnetic field.

8. An apparatus in accordance with claim 7 further comprising means for maintaining any desired aspect ratio.

9. An apparatus in accordance with claim 7 wherein said coordinating means includes a Hall effect sensor.

* * * * *